US011370050B2

(12) United States Patent
Davidson et al.

(10) Patent No.: US 11,370,050 B2
(45) Date of Patent: Jun. 28, 2022

(54) CONTROLLED SHORT CIRCUIT WELDING SYSTEM AND METHOD

(71) Applicant: ILLINOIS TOOL WORKS INC., Glenview, IL (US)

(72) Inventors: Robert R. Davidson, New London, WI (US); Justin Durik, Black Creek, WI (US); Richard Schuh, Freedom, WI (US); David Almy, Freemont, WI (US); Richard Martin Hutchison, Iola, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/674,514

(22) Filed: Mar. 31, 2015

(65) Prior Publication Data

US 2016/0288235 A1    Oct. 6, 2016

(51) Int. Cl.
*B23K 9/09* (2006.01)
*B23K 9/095* (2006.01)
(Continued)

(52) U.S. Cl.
CPC .............. *B23K 9/093* (2013.01); *B23K 9/06* (2013.01); *B23K 9/092* (2013.01); *B23K 9/0953* (2013.01); *B23K 9/173* (2013.01)

(58) Field of Classification Search
CPC .......... B23K 9/093; B23K 9/06; B23K 9/092; B23K 9/0953; B23K 9/173
USPC .............. 219/137 PS, 130.51, 130.21, 130.5, 219/130.33, 136, 130.01, 130.31, 137.71, 219/130.1, 130.4, 121.54; 323/212
See application file for complete search history.

(56) References Cited

U.S. PATENT DOCUMENTS

| 2,365,958 A | 12/1944 | Holslag |
| 2,416,047 A | 2/1947 | Dolan |

(Continued)

FOREIGN PATENT DOCUMENTS

| CA | 2072711 | 12/1992 |
| CN | 2181354 | 11/1994 |

(Continued)

OTHER PUBLICATIONS

"ALT 304," Miller—The Power of Blue, Jun. 2001.
(Continued)

*Primary Examiner* — Dana Ross
*Assistant Examiner* — Joe E Mills, Jr.
(74) *Attorney, Agent, or Firm* — McAndrews, Held & Malloy, Ltd.

(57) ABSTRACT

A welding system and method provide for generating a controlled waveform for welding power output, the waveform comprising a plurality of successive peak phases followed by a short circuit between a welding wire electrode and an advancing weld puddle. Each then present peak phase is regulated based upon at least the immediately preceding short circuit to control the short circuit that will occur following the then present peak phase. Some embodiments permit regulating at least one waveform phase based upon at least the immediately preceding short circuit to control the next short circuit that will occur, and regulating at least one short response phase based upon at least the immediately preceding short circuit to control the next short circuit that will occur.

23 Claims, 5 Drawing Sheets

(51) Int. Cl.
  *B23K 9/173* (2006.01)
  *B23K 9/06* (2006.01)

(56) References Cited

U.S. PATENT DOCUMENTS

| | | | |
|---|---|---|---|
| 3,288,982 A | 11/1966 | Haruyoshi | |
| 3,725,629 A | 4/1973 | Vickers | |
| 3,809,853 A | 5/1974 | Manz | |
| 3,849,871 A | 11/1974 | Kaunitz | |
| 3,946,349 A | 3/1976 | Haldeman | |
| 4,160,967 A | 7/1979 | Beech | |
| 4,188,419 A | 2/1980 | Detert | |
| 4,222,023 A | 9/1980 | Beech | |
| 4,426,565 A | 1/1984 | Rueter | |
| 4,447,703 A | 5/1984 | Stol | |
| 4,493,971 A | 1/1985 | Nawa | |
| 4,531,040 A | 7/1985 | Nawa | |
| 4,536,634 A | 8/1985 | Nawa | |
| 4,546,234 A | 10/1985 | Ogasawara | |
| 4,580,026 A | 4/1986 | Stol | |
| 4,628,182 A | 12/1986 | Hori | |
| 4,631,385 A | 12/1986 | Rothermel | |
| 4,667,083 A | 5/1987 | Stol | |
| 4,728,761 A | 3/1988 | Mucha | |
| 4,897,523 A | 1/1990 | Parks | |
| 4,950,348 A | 8/1990 | Larsen | |
| 4,954,691 A | 9/1990 | Parks | |
| 4,973,821 A | 11/1990 | Martin | |
| 5,001,326 A | 3/1991 | Stava | |
| 5,043,557 A | 8/1991 | Tabata | |
| 5,086,207 A | 2/1992 | Deam | |
| 5,101,086 A | 3/1992 | Dion | |
| 5,118,028 A | 6/1992 | Ogawa | |
| 5,140,123 A | 8/1992 | Mitani | |
| 5,148,001 A | 9/1992 | Stava | |
| 5,208,433 A | 5/1993 | Hellegouarc | |
| 5,270,516 A | 12/1993 | Hamamoto | |
| 5,278,390 A | 1/1994 | Blankenship | |
| 5,315,089 A | 5/1994 | Hughes | |
| 5,319,179 A | 6/1994 | Joecks | |
| 5,343,023 A | 8/1994 | Geissler | |
| 5,349,156 A | 9/1994 | Madigan | |
| 5,352,871 A | 10/1994 | Ross | |
| 5,367,138 A | 11/1994 | Moss | |
| 5,412,184 A | 5/1995 | McGaffigan | |
| 5,461,215 A | 10/1995 | Haldeman | |
| 5,466,916 A | 11/1995 | Iguchi | |
| 5,504,309 A | 4/1996 | Geissler | |
| 5,526,561 A | 6/1996 | McGaffigan | |
| 5,710,413 A | 1/1998 | King | |
| 5,714,738 A | 2/1998 | Hauschulz | |
| 5,739,506 A | 4/1998 | Hanton | |
| 5,742,029 A | 4/1998 | Stava | |
| 5,756,967 A | 5/1998 | Quinn | |
| 5,773,799 A | 6/1998 | Maxfield | |
| 5,783,799 A | 7/1998 | Geissler | |
| 5,844,193 A | 12/1998 | Nomura | |
| 5,963,022 A | 10/1999 | Buda | |
| 5,968,587 A | 10/1999 | Frankel | |
| 6,002,104 A | 12/1999 | Hsu | |
| 6,008,470 A | 12/1999 | Zhang | |
| 6,043,471 A | 3/2000 | Wiseman | |
| 6,051,810 A | 4/2000 | Stava | |
| 6,090,067 A | 7/2000 | Carter | |
| 6,107,602 A | 8/2000 | Geissler | |
| 6,115,273 A | 9/2000 | Geissler | |
| 6,169,263 B1 | 1/2001 | Derby | |
| 6,204,476 B1 | 3/2001 | Reynolds | |
| 6,248,976 B1 | 6/2001 | Blankenship | |
| 6,265,688 B1 | 7/2001 | Lyshkow | |
| 6,278,074 B1 | 8/2001 | Morlock | |
| 6,292,715 B1 | 9/2001 | Rongo | |
| 6,331,694 B1 | 12/2001 | Blankenship | |
| 6,359,258 B1 | 3/2002 | Blankenship | |
| 6,479,792 B1 | 11/2002 | Beiermann | |
| 6,486,439 B1 | 11/2002 | Spear | |
| 6,515,259 B1 | 2/2003 | Hsu | |
| 6,583,386 B1 | 6/2003 | Ivkovich | |
| 6,596,970 B2 | 7/2003 | Blankenship | |
| 6,624,388 B1 | 9/2003 | Blankenship | |
| 6,642,482 B2 | 11/2003 | Rappl | |
| 6,670,579 B2 | 12/2003 | Davidson | |
| 6,707,001 B1 | 3/2004 | Ulrich | |
| 6,710,297 B1 | 3/2004 | Artelsmair | |
| 6,720,529 B2 | 4/2004 | Davidson | |
| 6,744,012 B2 | 6/2004 | Ueda | |
| 6,747,247 B2 | 6/2004 | Holverson | |
| 6,849,828 B2 | 2/2005 | Aigner | |
| 6,906,284 B2 | 6/2005 | Kim | |
| 6,909,067 B2 | 6/2005 | Davidson | |
| 6,933,466 B2 | 8/2005 | Hutchison | |
| 6,958,263 B2 | 10/2005 | Bhattacharyya | |
| 6,974,931 B2 | 12/2005 | Holverson | |
| 6,974,932 B2 | 12/2005 | Holverson | |
| 6,984,806 B2 | 1/2006 | Huismann | |
| 6,995,338 B2 | 2/2006 | Hutchison | |
| 7,002,103 B2 | 2/2006 | Holverson | |
| 7,129,443 B2 | 10/2006 | Davidson | |
| 7,145,101 B2 | 12/2006 | Tong | |
| 7,244,905 B2 | 7/2007 | Das | |
| 7,265,320 B2 | 9/2007 | Ou | |
| 7,304,269 B2 | 12/2007 | Fulmer | |
| 7,307,240 B2 | 12/2007 | Holverson | |
| 7,351,933 B2 | 4/2008 | Huismann | |
| 7,598,475 B2 * | 10/2009 | Kawamoto | B23K 9/073 219/130.51 |
| 7,683,290 B2 | 3/2010 | Daniel | |
| 8,203,100 B2 | 6/2012 | Ueda | |
| 8,288,686 B2 | 10/2012 | Kaufman | |
| 8,487,215 B2 | 7/2013 | Holverson | |
| 9,403,231 B2 | 8/2016 | Hutchison | |
| 9,539,662 B2 | 1/2017 | Hutchison | |
| 2002/0008095 A1 * | 1/2002 | Norrish | B23K 9/092 219/137 PS |
| 2002/0045970 A1 | 4/2002 | Krause | |
| 2002/0107825 A1 | 8/2002 | Manicke | |
| 2002/0117487 A1 | 8/2002 | Corby | |
| 2002/0117488 A1 | 8/2002 | Arndt | |
| 2003/0058149 A1 | 3/2003 | Jayadeva | |
| 2004/0010342 A1 | 1/2004 | Thelen | |
| 2004/0069759 A1 * | 4/2004 | Davidson | B23K 9/091 219/130.5 |
| 2004/0182828 A1 | 9/2004 | Schmidt | |
| 2004/0222204 A1 | 11/2004 | Hutchison | |
| 2004/0238511 A1 | 12/2004 | Matus | |
| 2005/0184039 A1 | 8/2005 | Stava | |
| 2005/0269306 A1 | 12/2005 | Fulmer | |
| 2006/0163229 A1 | 7/2006 | Hutchison | |
| 2007/0051711 A1 | 3/2007 | Kachline | |
| 2007/0084840 A1 | 4/2007 | Davidson | |
| 2007/0102407 A1 | 5/2007 | Uezono | |
| 2007/0170163 A1 | 7/2007 | Narayanan | |
| 2007/0235434 A1 | 10/2007 | Davidson | |
| 2007/0267394 A1 | 11/2007 | Beck | |
| 2008/0078812 A1 * | 4/2008 | Peters | B23K 9/0953 228/101 |
| 2008/0264916 A1 | 10/2008 | Nagano | |
| 2008/0264917 A1 | 10/2008 | White | |
| 2008/0264923 A1 | 10/2008 | White | |
| 2009/0026188 A1 | 1/2009 | Schorghuber | |
| 2009/0120921 A1 * | 5/2009 | Makimaa | B23K 9/091 219/137 PS |
| 2009/0173726 A1 | 7/2009 | Davidson | |
| 2010/0059493 A1 | 3/2010 | McAninch | |
| 2010/0096373 A1 | 4/2010 | Hillen | |
| 2010/0133250 A1 | 6/2010 | Sardy | |
| 2010/0176104 A1 | 7/2010 | Peters | |
| 2010/0308026 A1 | 12/2010 | Vogel | |
| 2010/0308027 A1 | 12/2010 | Vogel | |
| 2010/0314371 A1 | 12/2010 | Davidson | |
| 2011/0108527 A1 | 5/2011 | Peters | |
| 2011/0114612 A1 | 5/2011 | Holverson | |
| 2011/0163080 A1 | 7/2011 | Beck | |
| 2011/0204034 A1 | 8/2011 | Schartner | |

(56) References Cited

U.S. PATENT DOCUMENTS

| | | |
|---|---|---|
| 2011/0297658 A1 | 8/2011 | Peters |
| 2011/0248007 A1 | 10/2011 | Takeda |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1 | 5/2013 | Hutchison |
| 2013/0264323 A1* | 10/2013 | Daniel .................. B23K 9/093 219/137 PS |
| 2013/0270245 A1 | 10/2013 | Holverson |
| 2014/0021183 A1 | 1/2014 | Peters |
| 2014/0158669 A1 | 6/2014 | Davidson |
| 2014/0183176 A1 | 7/2014 | Hutchison |
| 2014/0217077 A1 | 8/2014 | Davidson |
| 2014/0251971 A1 | 9/2014 | Hearn |
| 2014/0263237 A1 | 9/2014 | Daniel |
| 2014/0263241 A1 | 9/2014 | Henry |
| 2014/0263243 A1 | 9/2014 | Marschke |
| 2014/0367370 A1 | 12/2014 | Hutchison |
| 2015/0001197 A1 | 1/2015 | Marschke |
| 2015/0083702 A1 | 3/2015 | Scott |
| 2015/0105898 A1 | 4/2015 | Adams |
| 2016/0074954 A1 | 3/2016 | Marschke |
| 2016/0144444 A1 | 5/2016 | Davidson |
| 2016/0167151 A1 | 6/2016 | Mehn |
| 2016/0318112 A1 | 11/2016 | Hutchison |

FOREIGN PATENT DOCUMENTS

| | | |
|---|---|---|
| CN | 1298778 | 6/2001 |
| CN | 1496774 | 5/2004 |
| CN | 1640603 | 7/2005 |
| CN | 1712168 | 12/2005 |
| CN | 1714978 | 1/2006 |
| CN | 1819887 | 8/2006 |
| CN | 1836818 | 9/2006 |
| CN | 1871093 | 11/2006 |
| CN | 1958208 | 5/2007 |
| CN | 101062530 | 10/2007 |
| CN | 201098775 | 8/2008 |
| CN | 101282813 | 10/2008 |
| CN | 101376191 | 3/2009 |
| CN | 101804495 | 8/2010 |
| CN | 101862886 | 10/2010 |
| CN | 102470473 | 5/2012 |
| CN | 102554418 | 7/2012 |
| CN | 102596475 | 7/2012 |
| CN | 102770228 | 11/2012 |
| CN | 202824943 | 3/2013 |
| CN | 104174975 | 12/2014 |
| CN | 104334305 | 2/2015 |
| DE | 2501928 | 7/1976 |
| DE | 19808383 | 9/1999 |
| EP | 0194045 | 9/1986 |
| EP | 0387223 | 9/1990 |
| EP | 1232825 | 8/2002 |
| EP | 2218537 | 8/2010 |
| EP | 2286949 | 2/2011 |
| FR | 1443701 | 6/1966 |
| JP | S5719166 | 2/1982 |
| JP | S57109573 | 7/1982 |
| JP | S60108175 | 6/1985 |
| JP | S60108176 | 6/1985 |
| JP | S6471575 | 3/1989 |
| JP | H03285768 | 12/1991 |
| JP | H06277840 | 10/1994 |
| JP | H07204848 | 8/1995 |
| JP | H11156542 | 6/1999 |
| JP | 2001276971 | 10/2001 |
| JP | 2003311409 | 11/2003 |
| JP | 2005034853 | 2/2005 |
| JP | 2006205189 | 8/2006 |
| JP | 2009072814 | 4/2009 |
| JP | 2015036146 | 4/2009 |
| JP | 4950819 | 6/2012 |
| KR | 1020120027764 | 3/2012 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |

OTHER PUBLICATIONS

"Maxstar 200 SD, DX, and LX," Miller Electric Mfg. Co., Oct. 2003.
Bondy et al., "Graph Theory with Appliations," University of Waterloo, 1976, p. 7-8.
International Search Report from PCT application No. PCT/US2016/017385, dated Jul. 19, 2016, 13 pgs.

\* cited by examiner

CONTROLLED SHORT CIRCUIT WELDING SYSTEM AND METHOD

BACKGROUND

The invention relates generally to welders, and more particularly to a welder configured to perform a welding operation in which a cyclic waveform is applied to welding wire to cause controlled short circuits between the wire and an advancing weld.

A wide range of welding systems and welding control regimes have been implemented for various purposes. In continuous welding operations, gas metal arc welding (GMAW), and more specifically, metal inert gas (MIG) techniques allow for formation of a continuing weld bead by feeding welding wire electrode shielded gas (typically an inert gas or gas containing inert agents) from a welding torch. Electrical power is applied to the welding wire and a circuit is completed through the workpiece to sustain an arc that melts the wire and the workpiece to form the desired weld.

Advanced forms of MIG welding are based upon generation of cyclic pulses that may cause controlled short circuits between the wire electrode and the advancing weld puddle comprising of melted metal of the workpieces and the wire electrode. That is, various pulsed regimes may be carried out in which current and/or voltage pulses are commanded by the power supply control circuitry to regulate the formation and deposition of metal droplets (and/or spray, and/or globules) from the welding wire, to sustain a desired heating and cooling profile of the weld puddle, to control short circuits between the wire and the weld puddle, and so forth.

While very effective in many applications, such pulsed and short circuit welding regimes may be subject to drawbacks. For example, depending upon the transfer mode, the processes may either limit travel speed, create excessive spatter (requiring timely cleanup of welded workpieces), provide less than optimal penetration, or any combination of these and other effects. Moreover, certain pulsed processes, such as ones operating in a spray mode of material transfer, may run excessively hot for particular applications. Others, such as short circuit processes, may run cooler, but may again produce spatter and other unwanted weld effects.

Moreover, in certain welding situations and with certain welding electrodes, pulsed welding processes that are trained to implement cyclic short circuits between the electrode and the workpiece may add excessive energy to the weld. For example, with cored wire electrodes, the electrode may be heated by excessive current added to the wire, particularly insomuch as the weld current tends to flow through the wire sheath, which can more easily melt than solid wires. As a result, the arc may flare (grow long). However, for spanning gaps, reducing burn-through, and increasing travel speeds, it may be desirable to maintain the arc length at a minimum. Unfortunately, this causes the wire to short to the progressing weld puddle and requires additional current to clear short circuits, again leading to heating of cored wire sheaths, and causing the arc to flare.

There is a need, therefore, for improved welding strategies that allow for welding in pulsed and short circuit waveform regimes while improving weld quality and flexibility.

BRIEF DESCRIPTION

The present disclosure provides welding systems and methods designed to respond to such needs. In accordance with an exemplary implementation, a welding method comprises generating a control waveform for welding power output, the waveform comprising a plurality of successive peak phases followed by a short circuit between a welding wire electrode and an advancing weld puddle; and regulating each then present peak phase based upon at least the immediately preceding short circuit to control the short circuit that will occur following the then present peak phase.

In some embodiments, the methods and systems allow for regulating at least one waveform phase based upon at least the immediately preceding short circuit to control the next short circuit that will occur, and/or regulating at least one short response phase based upon at least the immediately preceding short circuit to control the next short circuit that will occur.

DETAILED DESCRIPTION

Figure 1:
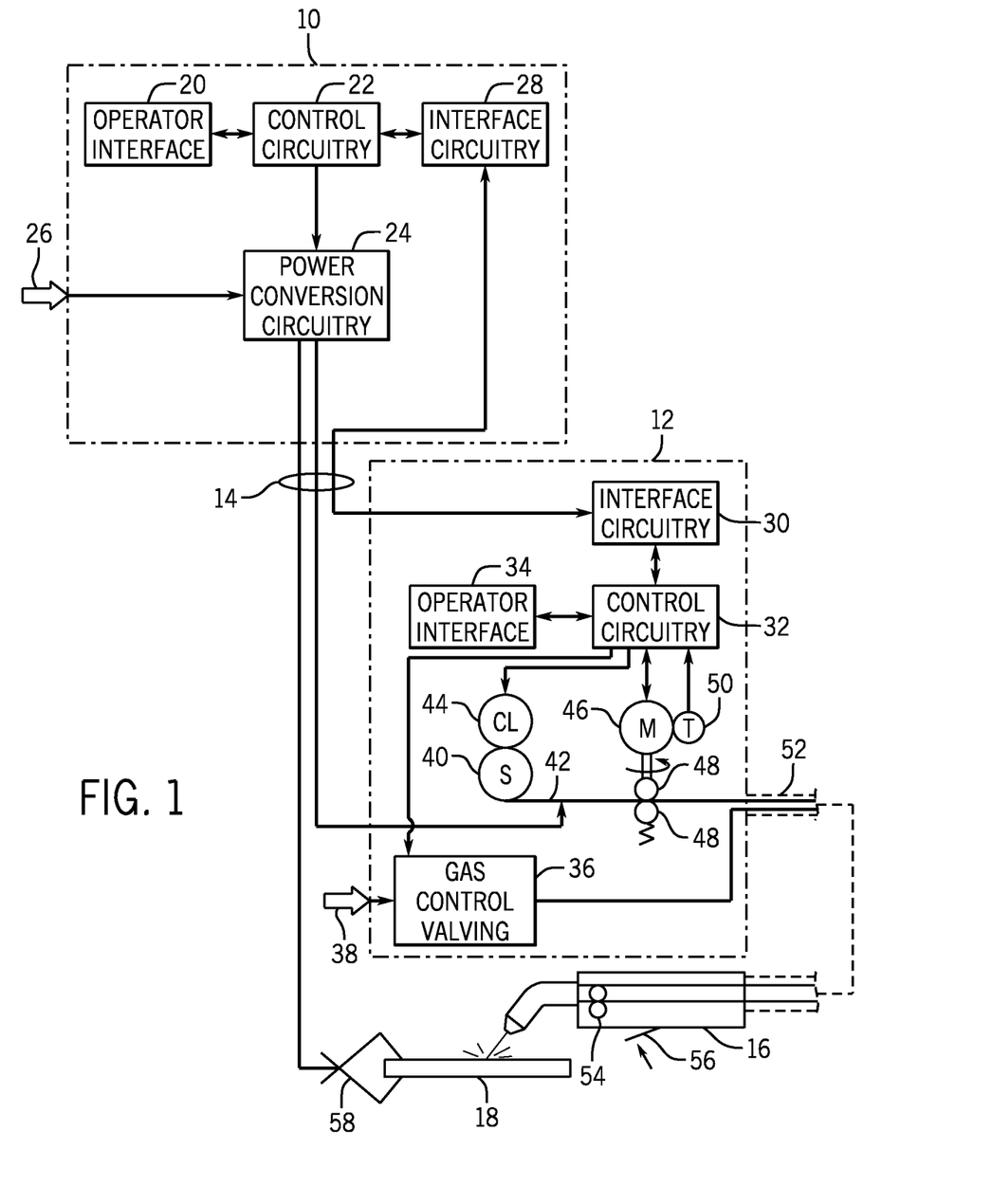
FIG. 1 is a diagrammatical representation of an exemplary MIG welding system illustrating a power supply coupled to a wire feeder for performing pulsed/controlled short circuit welding operations in accordance with aspects of the present techniques.

Turning now to the drawings, and referring first to FIG. 1, an exemplary welding system is illustrated as including a power supply 10 and a wire feeder 12 coupled to one another via conductors or conduits 14. In the illustrated embodiment the power supply 10 is separate from the wire feeder 12, such that the wire feeder may be positioned at some distance from the power supply near a welding location. However, it should be understood that the wire feeder, in some implementations, may be integral with the power supply. In such cases, the conduits 14 would be internal to the system. In embodiments in which the wire feeder is separate from the power supply, terminals are typically provided on the power supply and on the wire feeder to allow the conductors or conduits to be coupled to the systems so as to allow for power and gas to be provided to the wire feeder from the power supply, and to allow data to be exchanged between the two devices.

The system is designed to provide wire, power and shielding gas to a welding torch 16. As will be appreciated by those skilled in the art, the welding torch may be of many different types, and typically allows for the feed of a welding wire and gas to a location adjacent to a workpiece 18 where a weld is to be formed to join two or more pieces of metal. A second conductor is typically run to the welding workpiece so as to complete an electrical circuit between the power supply and the workpiece.

The system is designed to allow for data settings to be selected by the operator, particularly via an operator interface 20 provided on the power supply. The operator interface will typically be incorporated into a front faceplate of the power supply, and may allow for selection of settings such as the weld process, the type of wire to be used, voltage and current settings, and so forth. In particular, the system is designed to allow for MIG welding with various steels, aluminums, or other welding wire that is channeled through the torch. These weld settings are communicated to control circuitry 22 within the power supply. The system may be particularly adapted to implement welding regimes designed for certain electrode types.

The control circuitry, described in greater detail below, operates to control generation of welding power output that is applied to the welding wire for carrying out the desired welding operation. In certain presently contemplated embodiments, for example, the control circuitry may be adapted to regulate a pulsed MIG welding regime that promotes short circuit transfer of molten metal to a progressing weld puddle without adding excessive energy to the weld or electrode. In "short circuit" modes, droplets of molten material form on the welding wire under the influence of heating by the welding arc, and these are periodically transferred to the weld puddle by contact or short circuits between the wire and droplets and the weld puddle. "Pulsed welding" or "pulsed MIG welding" refers to techniques in which a pulsed power waveform is generated, such as to control deposition of droplets of metal into the progressing weld puddle. In a particular embodiment of the invention, a specialized pulsed welding regime may be implemented in which pulses are generated that have characteristics of both short circuit welding and spray welding, in a type of "hybrid" transfer mode as described in U.S. patent application Ser. No. 13/655,174, entitled "Hybrid Pulsed-Short Circuit Welding Regime", filed by Hutchison et al., on Oct. 18, 2012, which is hereby incorporated by reference into the present disclosure.

As described more fully below, the present techniques allow for control successive voltage and/or current pulses based on previous pulses so as to control the promotion, occurrence, duration, and interruption of short circuits between the welding wire electrode and the advancing weld puddle. In particular, in certain presently contemplated embodiments, voltage peaks in waveforms are regulated based on one or more immediately preceding short circuit, or aspects of the short circuit, such as its duration. Aspects of the voltage peaks may include, for example, their duration, their magnitude, their rate of rise or decline, and so forth. Aspects of current waveforms may also be directly or indirectly regulated. Various bases may be employed for the analysis of the short circuits, heating, heat injection, and so forth, as discussed below.

The control circuitry is coupled to power conversion circuitry 24. This power conversion circuitry is adapted to create the output power, such as pulsed waveforms that will ultimately be applied to the welding wire at the torch. Various power conversion circuits may be employed, including choppers, boost circuitry, buck circuitry, inverters, converters, and so forth. The configuration of such circuitry may be of types generally known in the art in and of itself. The power conversion circuitry 24 is coupled to a source of electrical power as indicated by arrow 26. The power applied to the power conversion circuitry 24 may originate in the power grid, although other sources of power may also be used, such as power generated by an engine-driven generator, batteries, fuel cells or other alternative sources. Finally, the power supply illustrated in FIG. 1 includes interface circuitry 28 designed to allow the control circuitry 22 to exchange signals with the wire feeder 12.

The wire feeder 12 includes complimentary interface circuitry 30 that is coupled to the interface circuitry 28. In some embodiments, multi-pin interfaces may be provided on both components and a multi-conductor cable run between the interface circuitry to allow for such information as wire feed speeds, processes, selected currents, voltages or power levels, and so forth to be set on either the power supply 10, the wire feeder 12, or both.

The wire feeder 12 also includes control circuitry 32 coupled to the interface circuitry 30. As described more fully below, the control circuitry 32 allows for wire feed speeds to be controlled in accordance with operator selections, and permits these settings to be fed back to the power supply via the interface circuitry. The control circuitry 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuitry 32 is also coupled to gas control valving 36 which regulates the flow of shielding gas to the torch. In general, such gas is provided at the time of welding, and may be turned on immediately preceding the weld and for a short time following the weld. The gas applied to the gas control valving 36 is typically provided in the form of pressurized bottles, as represented by reference numeral 38.

The wire feeder 12 includes components for feeding wire to the welding torch and thereby to the welding application, under the control of control circuitry 32. For example, one or more spools of welding wire 40 are housed in the wire feeder. Welding wire 42 is unspooled from the spools and is progressively fed to the torch. The spool may be associated with a clutch 44 that disengages the spool when wire is to be fed to the torch. The clutch may also be regulated to maintain a minimum friction level to avoid free spinning of the spool. A feed motor 46 is provided that engages with feed rollers 48 to push wire from the wire feeder towards the torch. In practice, one of the rollers 48 is mechanically coupled to the motor and is rotated by the motor to drive the wire from the wire feeder, while the mating roller is biased towards the wire to maintain good contact between the two rollers and the wire. Some systems may include multiple rollers of this type. Finally, a tachometer 50 may be provided for detecting the speed of the motor 46, the rollers 48, or any other associated component so as to provide an indication of the actual wire feed speed. Signals from the tachometer are fed back to the control circuitry 32, such as for calibration as described below.

It should be noted that other system arrangements and input schemes may also be implemented. For example, the welding wire may be fed from a bulk storage container (e.g., a drum) or from one or more spools outside of the wire feeder. Similarly, the wire may be fed from a "spool gun" in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Power from the power supply is applied to the wire electrode, typically by means of a welding cable 52 in a conventional manner. Similarly, shielding gas is fed through the wire feeder and the welding cable 52. During welding operations, the wire is advanced through the welding cable jacket towards the torch 16. Within the torch, an additional pull motor 54 may be provided with an associated drive roller, particularly for aluminum alloy welding wires. The motor 54 is regulated to provide the desired wire feed speed as described more fully below. A trigger switch 56 on the torch provides a signal that is fed back to the wire feeder and therefrom back to the power supply to enable the welding process to be started and stopped by the operator. That is, upon depression of the trigger switch, gas flow is begun, wire is advanced, power is applied to the welding cable 52 and through the torch to the advancing welding wire. These processes are also described in greater detail below. Finally, a workpiece cable and clamp 58 allow for closing an electrical circuit from the power supply through the welding torch, the electrode (wire), and the workpiece for maintaining the welding arc during operation.

It should be noted throughout the present discussion that while the wire feed speed may be "set" by the operator, the actual speed commanded by the control circuitry will typically vary during welding for many reasons. For example, automated algorithms for "run in" (initial feed of wire for arc initiation) may use speeds derived from the set speed. Similarly, various ramped increases and decreases in wire feed speed may be commanded during welding. Other welding processes may call for "cratering" phases in which wire feed speed is altered to fill depressions following a weld. Still further, in pulsed welding regimes, the wire feed speed may be altered periodically or cyclically.

Figure 2:
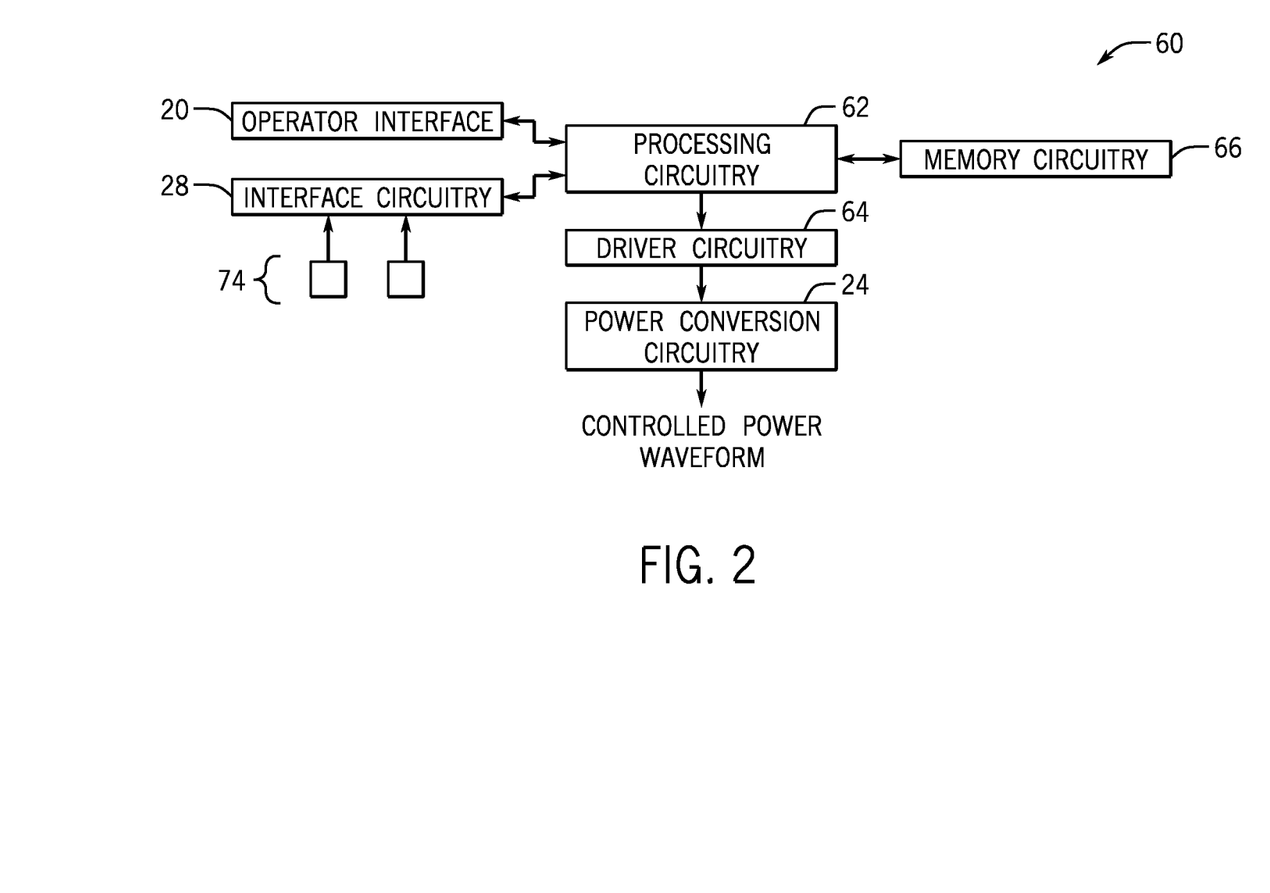
FIG. 2 is a diagrammatical representation of exemplary control circuitry components for a welding power supply of the type shown in FIG. 1.

FIG. 2 illustrates an exemplary embodiment for the control circuitry 22 designed to function in a system of the type illustrated in FIG. 1. The overall circuitry, designated here by reference numeral 60, includes the operator interface 20 discussed above and interface circuitry 28 for communication of parameters 74 to and from downstream components such as a wirefeeder, a welding torch, and various sensors and/or actuators. The circuitry includes processing circuitry 62 which itself may comprise one or more application-specific or general purpose processors, designed to carry out welding regimes, make computations for waveforms implemented in welding regimes, and so forth. The processing circuitry is associated with driver circuitry 64 which converts control signals from the processing to drive signals that are applied to power electronic switches of the power conversion circuitry 24. In general, the driver circuitry reacts to such control signals from the processing circuitry to allow the power conversion circuitry to generate controlled waveforms for pulsed welding regimes of the type described in the present disclosure. The processing circuitry 62 will also be associated with memory circuitry 66 which may consist of one or more types of permanent and temporary data storage, such as for providing the welding regimes implemented, storing welding parameters, storing weld settings, storing error logs, and so forth.

More complete descriptions of certain state machines for welding are provided, for example, in U.S. Pat. No. 6,747,247, entitled "Welding-Type Power Supply With A State-Based Controller", issued to Holverson et al. on Sep. 19, 2001; U.S. Pat. No. 7,002,103, entitled "Welding-Type Power Supply With A State-Based Controller", issued to Holverson et al. on May 7, 2004; U.S. Pat. No. 7,307,240, entitled "Welding-Type Power Supply With A State-Based Controller", issued to Holverson et al. on Feb. 3, 2006; and U.S. Pat. No. 6,670,579, entitled "Welding-Type System With Network And Multiple Level Messaging Between Components", issued to Davidson et al. on Sep. 19, 2001, all of which are incorporated into the present disclosure by reference.

Figure 3:
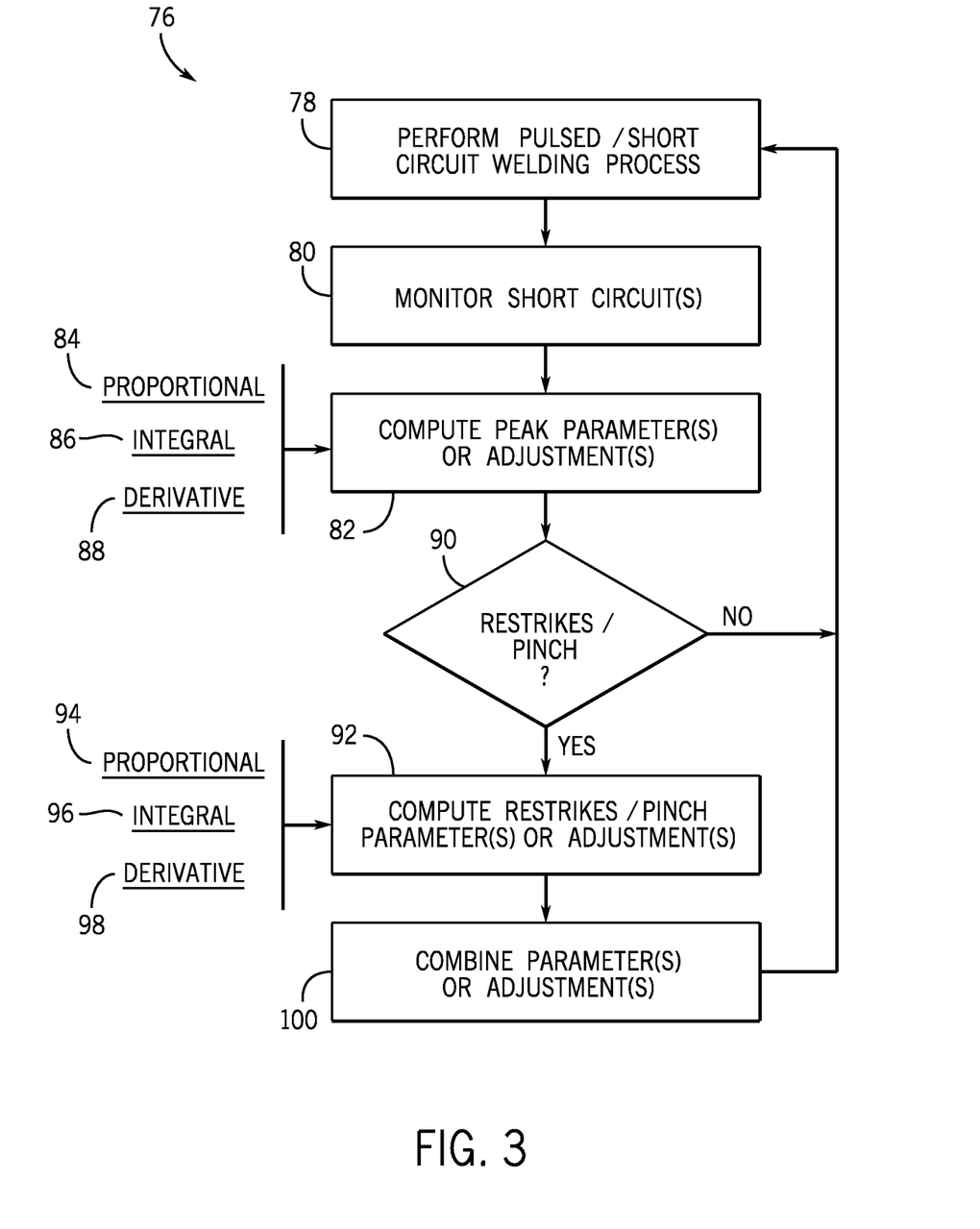
FIG. 3 is a flow chart illustrating certain control logic in implementing a welding regime in accordance with the present disclosure.

FIG. 3 generally illustrates logic for a welding regime in which waveforms are controlled to control short circuit characteristics. The logic, indicated generally by reference numeral 76 may be thought of as beginning with performing a pulsed/short circuit welding process, as indicated by block 78. Such a process may be implemented by closed loop control of voltage applied to a welding electrode (with a circuit completed through the workpiece and advancing weld puddle), by closed loop control of current applied to the electrode, or by control of both voltage and current. In some embodiments, for example, control loops that regulate voltage in a closed loop manner may be alternated with phases of control in which current is controlled in a closed loop manner. In a presently contemplated embodiment, a short circuit is promoted or permitted in each cycle of a pulsed process, and parameters of the voltage and/or current waveforms of power applied to the welding electrode are controlled and regulated to control aspects of the short circuit, particularly its duration, but also its timing, heating, restrike energy and so forth.

At step 80, then, the short circuit is monitored. Such monitoring will typically be done by detecting the voltage and current applied to the welding electrode, the welding torch, the weld cable, or some other point in the power stream. In currently contemplated embodiments, the voltage and current are sampled at a much higher rate than the frequency of the pulsed welding regime. For example, each pulse cycle may be on the order of several milliseconds (e.g., 5 ms), whereas the sampling may be performed on the order of microseconds (e.g., every 50 µs). As will be appreciated by those skilled in the art, the occurrence of short circuits will typically be indicated by drops in voltage. However, in most systems, the voltage and current sampling will occur throughout the welding process, and analysis of the voltage and/or current during the short circuit may be done from the data collected. The duration of the short circuit may be determined by examining how many sampling intervals occurred with the levels of voltage and/or the current were such as would indicate a short circuit (e.g., a threshold low voltage).

At step 82 parameters of voltage and/or current peaks are computed or adjustments may be made as discussed below. In current embodiments, the parameters of voltage peaks are computed, with the system controlling welding power in a voltage-closed loop manner during the peak phase of the pulsed waveform. That is, the voltage and/or current of the peak is controlled, including the magnitude of the peak, the duration of the peak, the rate of rise to the peak, and the rate of decline from the peak. Some embodiments may control fewer than these parameters. As discussed below, the peaks are regulated to appropriately control aspects of the cyclical short circuit, and particularly the timing and duration of the short circuit. As indicated by reference numerals 84, 86 and 88, one or more bases may be used for regulating the peak, such as proportional control, integral control, and derivative control. In currently contemplated embodiments, for example, the magnitude and/or duration (and/or rates of increase and decrease) of the peak are regulated based upon the duration of the short circuit in a proportional manner. However, integral factors may allow for more stable, longer-duration (e.g., multi-pulse) control, to eliminate errors from the desired peak parameters. Derivative factors may also aid, such as to improve response to the short circuit duration, timing, and so forth. In practice, more than one of these factors may be utilized, and exact algorithms for the regulation of the peaks may be adapted for particular welding applications, such as particular materials, particular electrodes, particular positions, travel speeds, and so forth. Moreover, in practice, each factor utilized may be multiplied by a desired gain, and such gains may be used to "teach" or adapt the control regime to arrive at more predictability and controllable short circuits, reduce energy applied to the weld, improve travel speed, reduce spatter, and so forth. In the current embodiment, while the adjustments are made to the peak, the adjustments may be made to the any of the waveform segments to achieve similar affects. To regulate the duration of a short, the short response, short energy or max short current may be modified as well (e.g., restrike or added energy to clear the short).

The "dynamic" adjustment of the peak (e.g., the voltage peak) by reference to the immediately preceding short circuit may be done in a variety of ways. For instance, the adjustment may be on the basis of short circuit duration alone. By way of example, if the short circuit is 1 ms long, it may be determined that this duration is appropriate, and no adjustment is made. If, then, the short duration of 0.5 ms is detected, it may be determined that the peak was too long and the short circuit was, consequently, too short (that is the molten ball was almost off the electrode before the short circuit occurred). In this case, the next peak duration may be made shorter, the magnitude of the peak may be changed, the ramp up or ramp down rates and durations may be changed, and so forth. Further, if the short does not occur at all (i.e., duration of 0 ms) or is very short, it may be determined that the peak was so large that the molten ball split from the electrode before any short occurred at all), and the peak may be more seriously altered to ensure a short circuit, and one that is consistent over time.

As for the particular calculations made, another possible basis for computing the short circuit parameter that is the basis for regulating the voltage peak is the resistive heating ($i^2r$) of the electrode. For this calculation, a resistance may be estimated, and detected currents used to estimate the heating (power) applied to the electrode. Still further, because the resistance may not change materially, this calculation may be simplified to a summation of squared currents or currents during the short duration. Here again, the duration of the short circuit may be determined based upon the number of sampling intervals over which the voltage and/or the current indicated the electrode was shorted to the weld puddle.

At step 90, the logic may determine whether another type of control may be useful to assist in short circuit duration and/or timing control. That is, if the short circuit is too long, a determination may be made that a "restrike" or "pinch" is needed. Such techniques may involve application of current (e.g., in a current-closed loop manner) or voltage to force re-establishment of the welding arc, and thereby to end the short circuit. If no such control is needed, the flow may return to step 78 to repeat the process for the next pulse. Or the control loop may take into account the duration and current of a desired short heating and use variations from the nominal much as the short duration control loop (discussed above).

In this process logic, it should be noted that the control of each peak is regulated based upon the immediately preceding short circuit. Again, due to the higher sampling rate of voltage and current as compared to the frequency of the voltage and current pulses of the control regime, each short circuit may be analyzed prior to implementation of the immediately subsequent peak phase. That is, the then-current peak phase (e.g., voltage peak) may be regulated based upon the immediately preceding short circuit characteristics, particularly the time of onset of the short circuit, the time of ending of the short circuit, short heating, short power and/or its duration. Moreover, in some embodiments, one or more characteristics of the short circuit (e.g., duration), one or more characteristics of the peaks, and/or one or more characteristics of adjustments made to the peaks may be low pass filtered by averaging over a number of pulse cycles. For example, the duration of the short circuit may be averaged to smooth response to the duration in making adjustments to the peak parameters. In general, however, at least the immediately preceding short circuit is used as a basis for altering or regulating the then-current peak. In the current embodiment, the peak is a regulated voltage peak controlled in a voltage-closed loop manner.

At step 90, if it is determined that the short circuit is longer than desired, a restrike or pinch may be implemented. In general, these aspects allow for control of voltage and/or current, and either in a voltage-closed loop or current-closed loop manner to promote termination of the short circuit earlier than it has been detected to end. At step 92, then, parameters of the voltage and/or current used to terminate the short circuit may be computed and/or altered. As with the peak, these parameters may be controlled based on proportional control, integral control, and/or derivative control, as indicated by reference numerals 94, 96, and 98, typically again based on the duration of the short circuit. Moreover, here again, the restrike or pinch may be based on the immediately preceding short circuit. Also, more than one short circuit occurrence may be referred to for this control, and low pass filtering, such as by averaging a number of short circuit occurrences (e.g., their durations). In the present embodiment the peak duration of the arc phase is modified by both the short heating and short duration, although the short response is envisioned as an alternative in some aspects of this control.

At step 100 the parameters and/or adjustments computed or implemented at steps 82 and 92 may be combined. For example, as will be recognized by those skilled in the art, adding energy by implementation of a restrike or pinch may affect the dynamics of the material transfer and heating, and this may need to be compensated for by altering the peak. Conversely, altering the peak may affect the short circuit (and typically will), so that more or less restrike or pinch is needed. In a presently contemplated embodiment, a control loop is implemented to compute a change in the peak parameter(s) based on short characteristics (e.g., duration), and another control loop is implemented to compute a change in the peak parameter(s) based on the restrike or pinch, and errors (adjustments or corrections) in the peak parameters resulting from these calculations are simply combined (e.g., added). Weighted sums may be generated in this approach by altering coefficients or gains of each correction from the two different loops.

Figure 4:
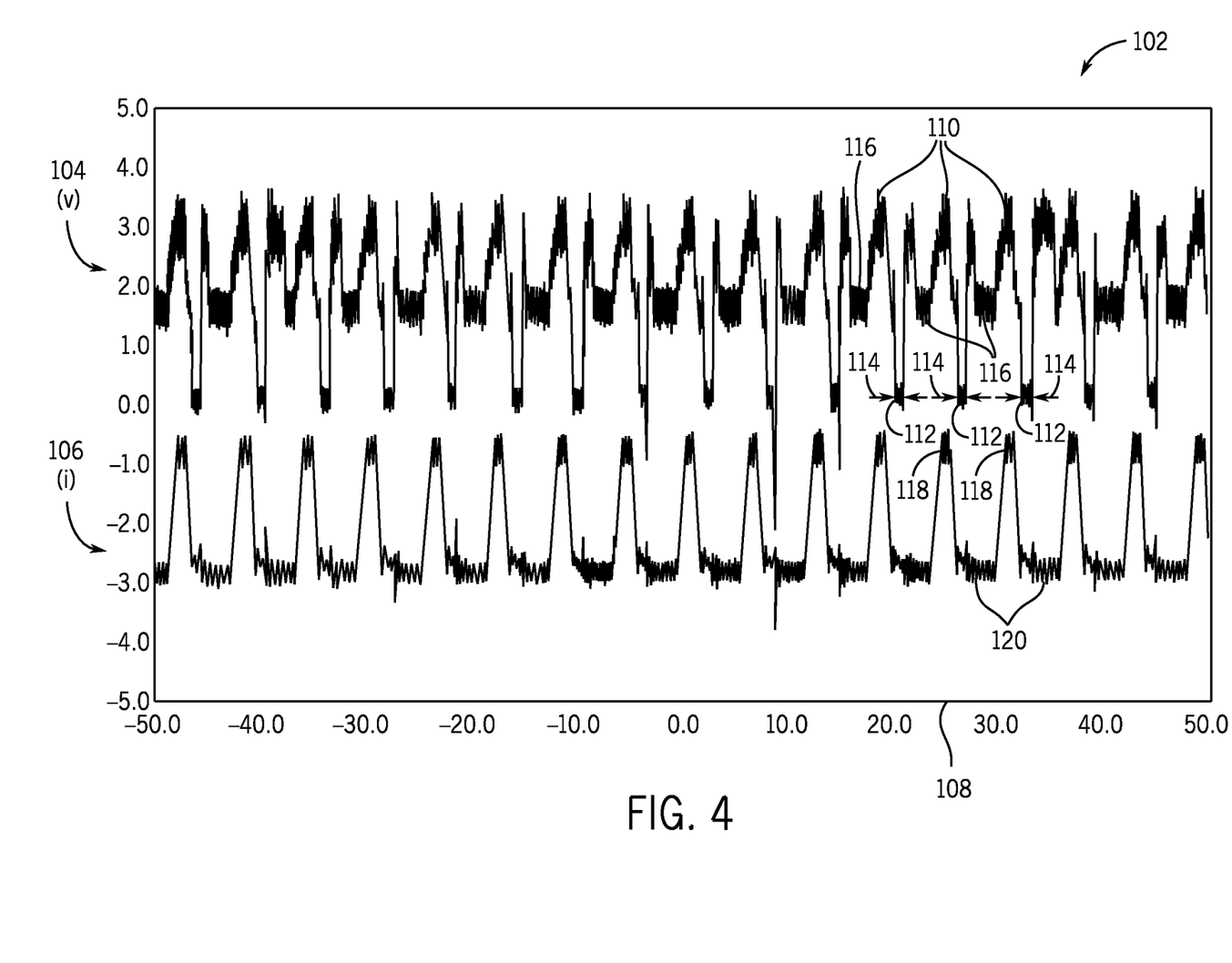
FIG. 4 is a graphical representation of voltages and currents in a series of pulses of such a waveform during an actual implementation.

FIG. 4 illustrates exemplary waveforms 102 for the improved process, these including a voltage waveform 104 and a current waveform 106, displayed over time 108 for a number of cycles of the pulsed/short circuit process. Here again, the process may include alternating periods or phases of voltage-closed loop control and current-closed loop ramp control, in this case, the peaks being voltage-closed loop controlled, followed by switching to current-closed loop control. In this process, molten metal from the electrode is transferred to the advancing weld puddle in a pulsed process in which short circuits are promoted and controlled by regulation of power (e.g., by voltage control) applied to the electrode. In the present context, promotion and control of short circuits is intended to convey that relatively hard short circuits are avoided, and that brief and controlled short circuits may be established by monitoring and analyzing aspects of at least one immediately preceding short circuit. The metal is thus transferred without adding excessive energy that might be required if harder or longer duration short circuits were employed. In most cycles of the resulting welding process, no special short clearing sequence will be needed, although such sequences may be programmed and ready to be implemented in case a longer or more stubborn short circuit does occur, as discussed above. As described above, because the molten material (e.g., a ball of metal) is already detaching after a voltage and/or current peak, little or no current is added to clear the short circuit. The result is relatively lower heating and a stable arc while avoiding unnecessary heating.

As shown in FIG. 4, voltage pulses are formed in the welding process that generally correspond in time to current pulses, the two being regulated, in this embodiment, by alternating between voltage-closed loop control and current-closed loop control. However, again, to control the duration and characteristics of the short circuits, voltage and current may be analyzed and used to provide a combined control that effectively regulates both the peaks and the short circuits (as well as other aspects of the pulses, when desired). The voltage peaks are indicated in FIG. 4 by reference numeral 110. These peaks generally cause energy to be input into the arc to melt the welding electrode. Short circuits then occur, resulting in a significant drop in voltage, as indicated by reference numeral 112. The duration of these short circuits, indicated by reference numeral 114 are controlled by regulating the energy (e.g., voltage) of the peaks, and it can be seen in the voltage trace that shorts tend to occur in every cycle of the process, and are of a quite uniform duration. After each short circuit is cleared, the system returns to a background voltage level to await the next peak, as indicated by reference numeral 116. The current peaks occur generally in synchronicity with the voltage peaks, as indicated by reference numeral 118. After the current peaks, current generally returns to a background level 120.

Figure 5:
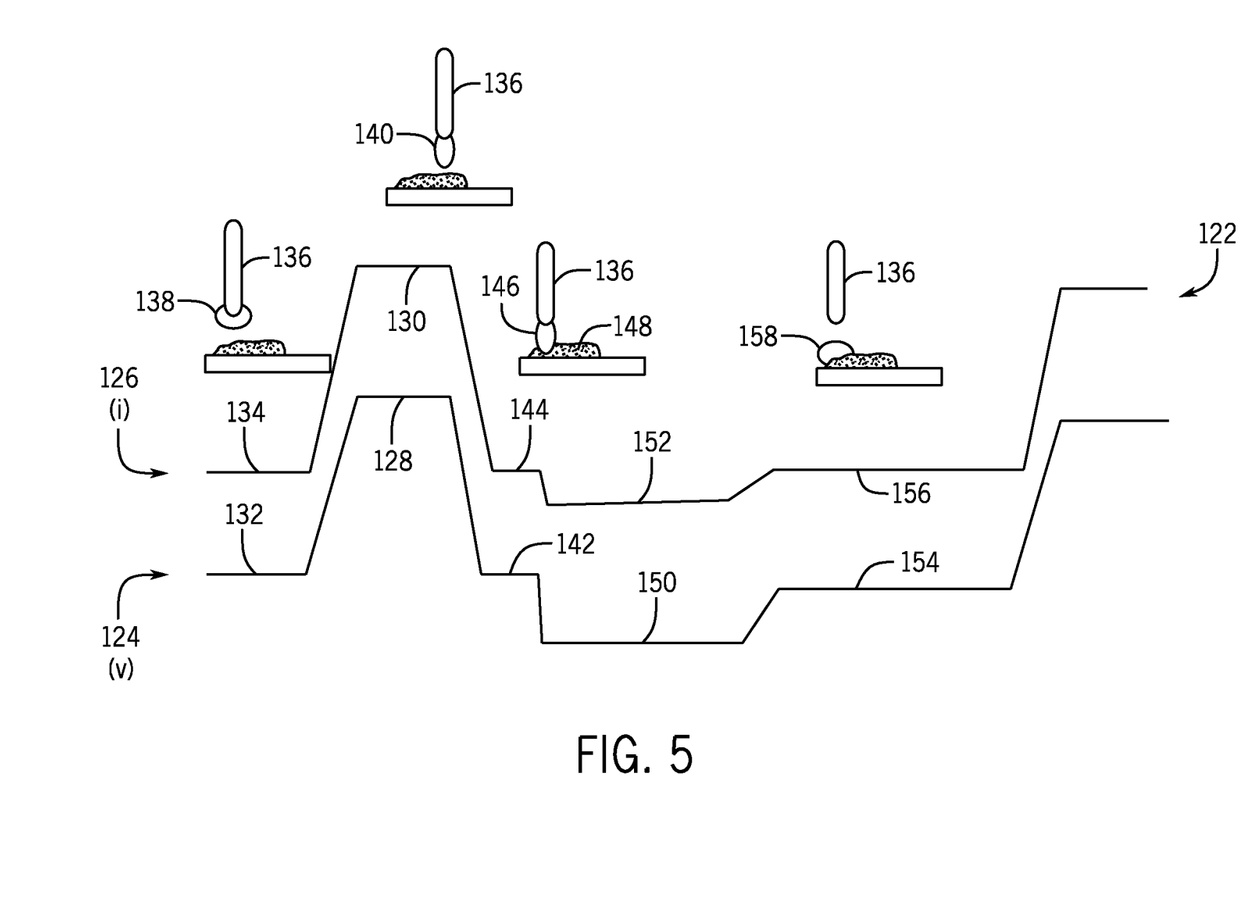
FIG. 5 is a graphical representation of an exemplary waveform for controlled short circuit welding in accordance with the present disclosure.

FIG. 5 is a similar graphical illustration of a single cycle 122 of this process. Here, the voltage waveform is indicated by reference numeral 124, and the current waveform by reference numeral 126. As can be seen, the voltage peak 128 is controlled and is generally aligned with the current peak 130. At these peak levels, the voltage rises from a background level 132 to the peak level, the magnitude, ramp rate, and duration of which may be controlled. The current similarly rises from its background 134. The peak phase of the cycle causes the welding electrode 136 to melt, forming a droplet of material 140 that will be deposited in weld. Following the peaks 128 and 130, then, the voltage returns to a background or step level 142, as does the current 144. Again, the ramp rate, the shape of the ramps, and so forth, may be controlled during these declines in voltage and current. The decline in voltage 142 to 150 corresponds to the short circuit between the welding electrode 136 and the advancing weld, as the formed droplet 146 is deposited into the weld puddle 148. The current may be dropped in response to this short as indicated by 144 to 152, it may also be slightly increased or maintained. In some embodiments the current is dropped from 144 to 152 to encourage the short of the wire to the weld puddle to occur in this area of the waveform (preceding the actual short).

The short circuit is then broken by reduction of energy into the weld when the voltage and current levels are dropped even further, as indicated by reference numerals 150 and 152. Here again, as discussed above, if it is determined that the peak, or any other period of energy input (or any other weld dynamics), has caused the short circuit to be longer than desired, a restrike or pinch can be implemented, in which interruption of the short circuit is promoted by increasing current (which, again, interplays with the voltage regulation, such as by combined control of the peak voltage characteristics). The short circuit is thus broken, and the voltage and current can return to their background levels, as indicated by reference numerals 154 and 156, as the electrode material 158 becomes integrated into the advancing weld.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding method comprising:
generating a control waveform for welding power output, the waveform comprising a plurality of successive cycles, the plurality of cycles each comprising a peak phase followed by a short circuit between an advancing welding wire electrode and a weld puddle;
for a first one of the plurality of cycles, analyzing a short circuit of a second one of the plurality of cycles that immediately precedes the first one of the plurality of cycles to determine at least one of energy, heating, or maximum current of the short circuit of the second one of the plurality of cycles; and
regulating at least a duration of the peak phase of the first one of the cycles based on the at least one of energy, heating, or maximum current of at least the short circuit of the second one of the plurality of cycles to control a short circuit phase of the first one of the plurality of cycles.

2. The method of claim 1, wherein control of the waveform is performed based on closed loop voltage control.

3. The method of claim 1, wherein the regulated peak phases comprise voltage peaks, and wherein the regulating of the peak phase of the first one of the cycles further comprises controlling at least one of voltage magnitude, current magnitude, rate of rise, and rate of decline.

4. The method of claim 1, wherein the peak phase of each of the plurality of cycles is controlled based upon duration of the short circuit phase of the immediately preceding cycle.

5. The method of claim 1, wherein the peak phase of each of the plurality of cycles is regulated by application of at least one of a proportional component or an integral component based upon at least the short circuit of the immediately preceding cycle, and wherein regulating comprises controlling at least one of voltage magnitude, current magnitude, duration, rate of rise, and rate of decline.

6. The method of claim 1, wherein the peak phase of each of the plurality of cycles is regulated based upon the short circuits of a plurality of preceding cycles, including the short circuit of the immediately preceding cycle.

7. The method of claim 1, comprising cyclically regulating peak phases of multiple successive cycles, and wherein the peak phases are regulated by controlling at least one of voltage, current, power, energy, heating, resistance, conductance magnitude, duration, rate of rise of voltage, and rate of decline of voltage.

8. A welding method comprising:
generating a control waveform for welding power output, the waveform comprising a plurality of successive cycles, the plurality of cycles each comprising a background phase, a peak phase following the background phase and having at least one of a higher current or a higher voltage than the background phase, and a short circuit phase following the peak phase, the short circuit phase comprising a short circuit between an advancing welding wire electrode and a weld puddle;

for a first one of the plurality of cycles, analyzing a short circuit of a second one of the plurality of cycles that immediately precedes the first one of the plurality of cycles to determine at least one of energy, heating, or maximum current of the short circuit of the second one of the plurality of cycles; and regulating the peak phase of the first one of the cycles based on the at least one of energy, heating, or maximum current of at least the short circuit of the second one of the plurality of cycles to control a duration of a short circuit phase of the first one of the plurality of cycles to be less than a target duration, for at least a predetermined duration of the short circuit phase or until the short circuit of the short circuit phase is cleared, to transfer a molten portion of the welding wire electrode during the predetermined duration.

9. The method of claim 8, wherein multiple arc waveform phases are adjusted based upon at least the short circuit of the second one of the plurality of cycles.

10. The method of claim 8, wherein control of the waveform is performed based on closed loop voltage control.

11. The method of claim 8, wherein the at least one waveform phase comprises peaks, and wherein the peaks are regulated by controlling at least one of voltage magnitude, current magnitude, duration, rate of rise, and rate of decline.

12. The method of claim 8, wherein each phase of each cycle of the plurality of cycles is controlled based upon duration of the short circuit immediately preceding the phase.

13. The method of claim 8, wherein each phase of each cycle of the plurality of cycles is regulated by application of at least a proportional component, a derivative component, or an integral component based upon at least the short circuit immediately preceding the phase, and wherein regulating by comprises controlling at least one of voltage magnitude, current magnitude, duration, rate of rise, and rate of decline.

14. A welding method comprising:

generating a control waveform for welding power output, the waveform comprising a plurality of successive cycles, the plurality of cycles each comprising an open arc phase followed by a short circuit between an advancing welding wire electrode and a weld puddle;

for a first one of the plurality of cycles, analyzing a short circuit of a second one of the plurality of cycles that immediately precedes the first one of the plurality of cycles to determine at least one of energy, heating, or maximum current of the short circuit of the second one of the plurality of cycles; and regulating at least a duration of a short response phase of the first one of the cycles based on the at least one of energy, heating, or maximum current of at least the short circuit of the second one of the plurality of cycles to control a next short circuit phase of the first one of the plurality of cycles.

15. The method of claim 14, wherein the short response phase of each of the plurality of cycles is controlled based upon duration, energy, heating, and/or maximum current of at least the short circuit of the immediately preceding cycle.

16. The method of claim 14, wherein multiple waveform phases are adjusted based upon at least the short circuit of the second one of the plurality of cycles.

17. The method of claim 14, wherein control of the waveform is performed based on closed loop voltage control.

18. The method of claim 14, wherein each short response phase of each cycle of the plurality of cycles is controlled based upon duration of the short circuit immediately preceding the short response phase.

19. The method of claim 14, wherein each short response phase of each cycle of the plurality of cycles is regulated by application of at least a proportional component and/or an integral component, and wherein the short response phase is regulated by controlling at least one of voltage magnitude, current magnitude, duration, rate of rise, and rate of decline of the short response phase.

20. A welding system comprising:

a power supply configured to convert electrical power from a source to a controlled pulsed waveform for performing a welding operation; and control circuitry coupled to the power supply and configured to:

control generation of the controlled pulsed waveform, the waveform comprising a plurality of successive cycles, the plurality of cycles each comprising a background phase, a peak phase following the background phase, and a short circuit between an advancing welding wire electrode and a weld puddle, the short circuit following the peak phase;

for a first one of the plurality of cycles, analyze a short circuit of a second one of the plurality of cycles that immediately precedes the first one of the plurality of cycles to determine at least one of energy, heating, or maximum current of the short circuit of the second one of the plurality of cycles; and regulate at least a duration of at least one arc phase of the first one of the cycles based on the at least one of energy, heating, or maximum current of at least the short circuit phase of the second one of the plurality of cycles to control a short circuit phase of the first one of the plurality of cycles.

21. The system of claim 20, wherein the at least one regulated arc phase comprises the peak phase.

22. The system of claim 20, wherein each phase is controlled based upon at least one of duration, energy, heating, or maximum current of at least the short circuit of the immediately preceding cycle.

23. The system of claim 20, wherein multiple waveform phases are adjusted based upon at least the short circuit of the immediately preceding cycle.

* * * * *